Dec. 1, 1925.
J. H. WAGENHORST
1,563,808
MANDREL FOR BATTERY JARS
Filed Oct. 10, 1921   2 Sheets-Sheet 1
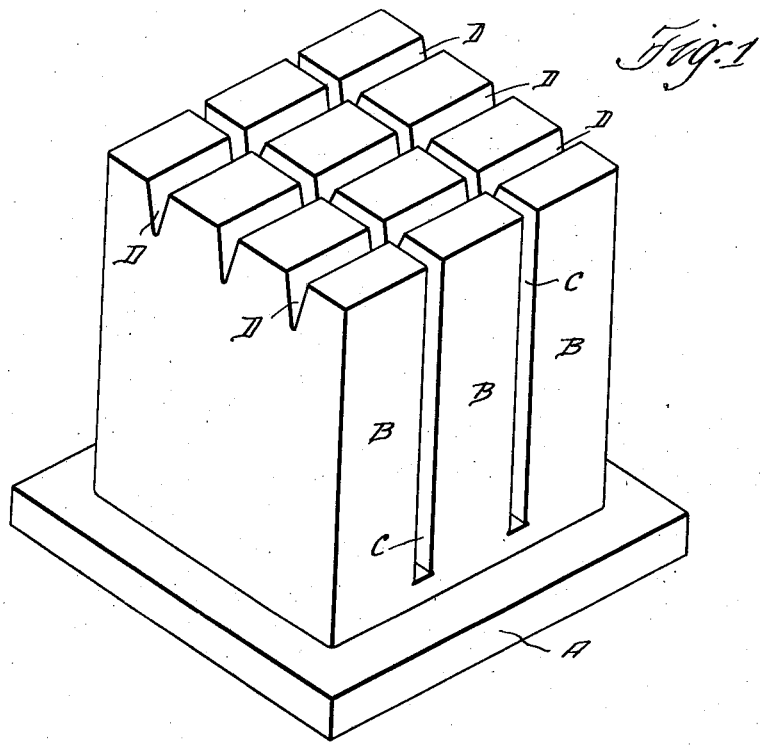
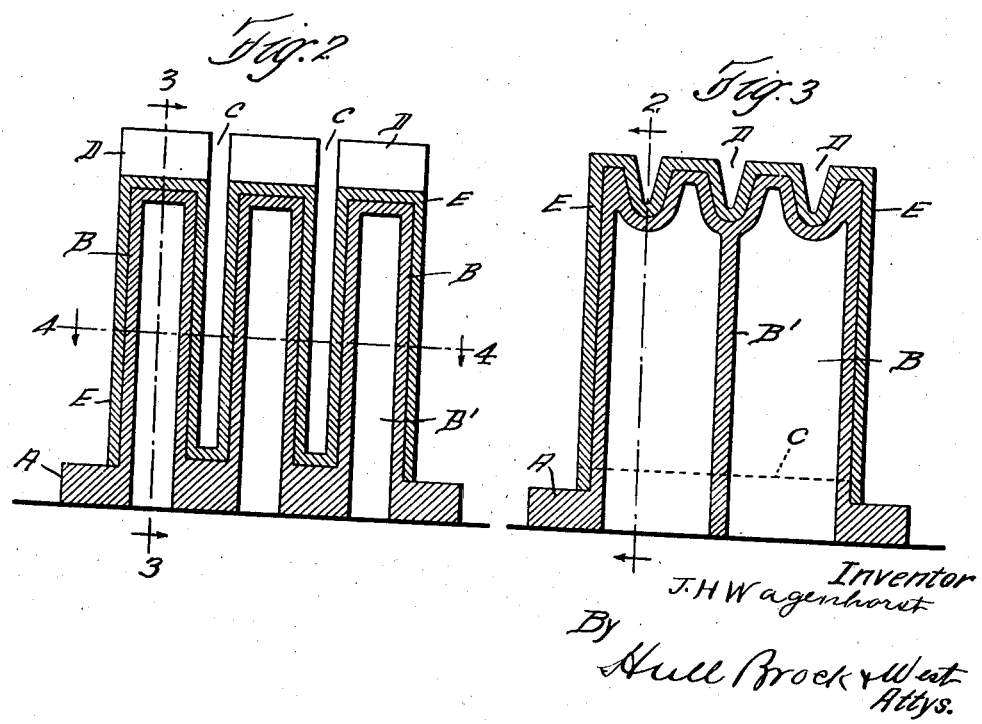
Inventor
J. H. Wagenhorst
By Hull Brock & West
Attys.

Dec. 1, 1925.
J. H. WAGENHORST
1,563,808
MANDREL FOR BATTERY JARS
Filed Oct. 10, 1921   2 Sheets-Sheet 2
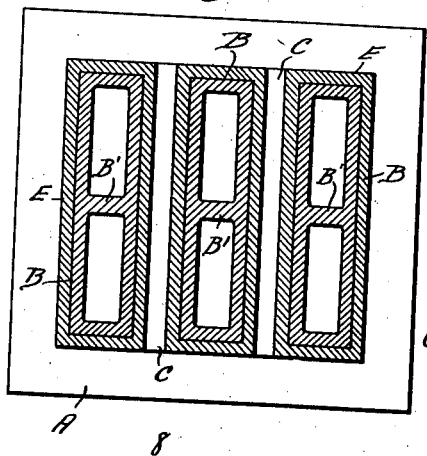
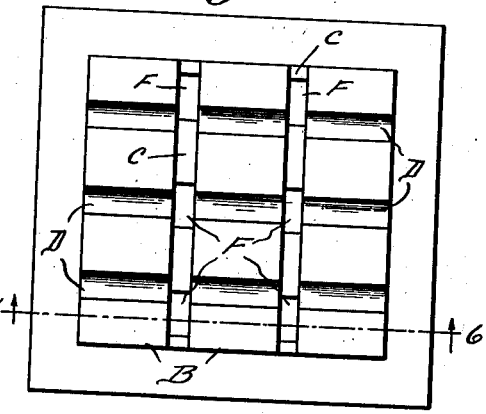
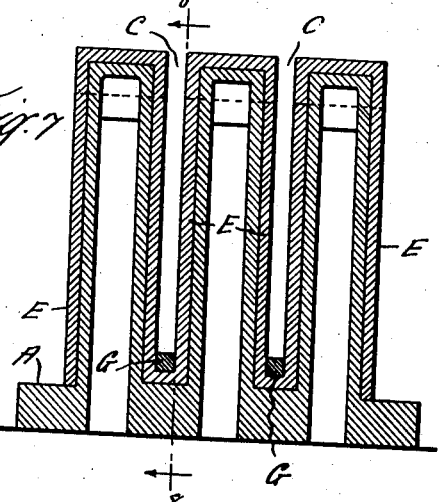
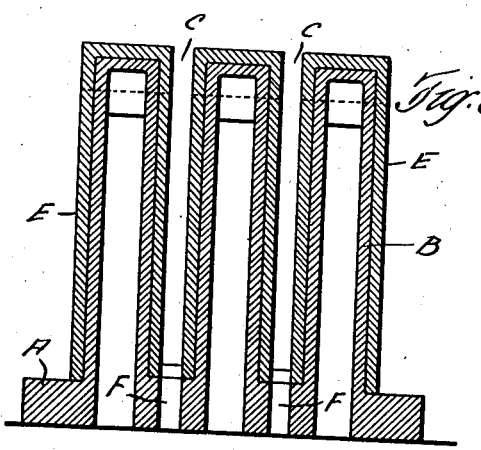
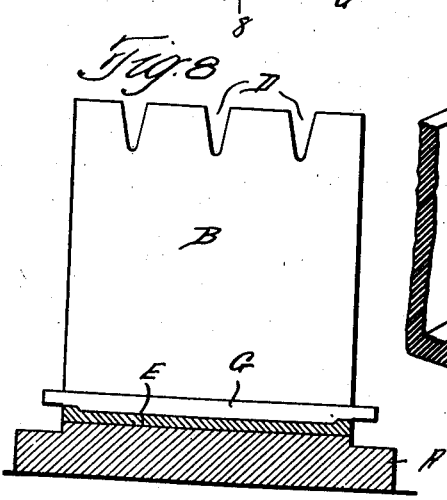
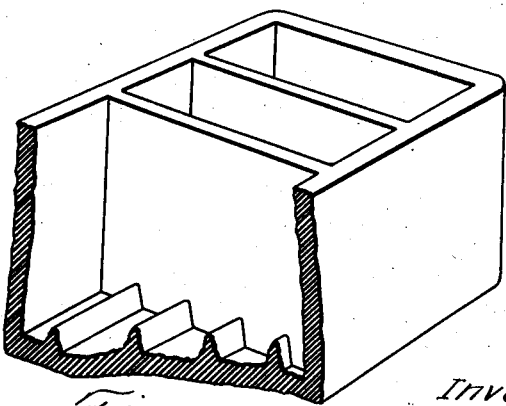
Inventor
J. H. Wagenhorst
By
Hull Brock & West.
Attys.

Patented Dec. 1, 1925.

1,563,808

UNITED STATES PATENT OFFICE.

JAMES H. WAGENHORST, OF JACKSON, MICHIGAN.

MANDREL FOR BATTERY JARS.

Application filed October 10, 1921. Serial No. 506,655.

*To all whom it may concern:*

Be it known that I, JAMES H. WAGENHORST, a citizen of the United States, residing at Jackson, in the county of Jackson and State of Michigan, have invented a certain new and useful Improvement in Mandrels for Battery Jars, of which the following is a full, clear, and exact description, reference being had to the accompanying drawings.

This invention relates generally to the formation of storage battery jars and more particularly to an improved construction of mandrel adapted for use in battery jar forming machines. Hereinbefore, it has been usual to form each cell separately upon the mandrel; vulcanize the same and then remove it from said mandrel and then assemble a plurality of such cells in a suitable box or case to provide a complete battery.

The object of the present invention is to provide a mandrel upon which a jar comprising a plurality of cells can be made at one time. That is, a jar comprising sides, ends and bottom sub-divided by partitions into the desired number of cells, each cell being provided with the plate supporting lugs or feet in the bottom thereof. By means of a mandrel of this character a great saving of time and labor will be effected and more uniformly accurate jars produced thereon. Another object of my invention is to not only provide for the forming of a multiple cell jar upon the unitary mandrel, but also to provide for stripping the vulcanized jar from the said mandrel. With these various objects in view the invention consists of the novel features of construction hereinafter fully described and set forth in the appended claims.

In the drawings forming a part of this specification, Fig. 1 is a perspective view of a mandrel for battery jar machines constructed in accordance with my invention; Fig. 2 is a sectional view on the line 2—2 of Fig. 3; Fig. 3 is a section on the line 3—3 of Fig. 2; Fig. 4 is a horizontal section on the line 4—4 of Fig. 2; Fig. 5 is a top plan view of a mandrel having openings in the bottom thereof to facilitate the stripping of the jar from the mandrel; Fig. 6 is a vertical sectional view on the line 6—6 of Fig. 5; Fig. 7 is a vertical sectional view of a slightly modified form of the device; Fig. 8 is a sectional elevation on the line 8—8 of Fig. 7 and Fig. 9 is a detailed perspective view of a battery jar formed upon my improved construction of mandrel, one corner of said box being broken away in order to disclose the lugs or feet in the bottom of one cell.

In Fig. 1 I have shown a mandrel capable of forming a jar comprising three cells, each cell having supporting lugs or feet formed in the bottom thereof to provide a suitable support for the plates of the storage battery. This improved form of mandrel comprises a base portion A and cell-forming portions B. These cell-forming portions B are spaced apart as shown at C a distance equal to the thickness of the partition wall which subdivides the jar into separate cells and the end of each cell-forming portion D is grooved or recessed to receive the lugs or feet as more fully described hereinafter. This unitary mandrel body consisting of the base portion A and the spaced cell-forming portions B is preferably made of cast metal and in practice I prefer to cast the same hollow as indicated in Figs. 2 to 7 inclusive and in order to provide the necessary strength, each cell-forming portion is provided with a central brace B' as most clearly shown in Figs. 2 and 4. The cast metal mandrel is preferably covered by a thin envelope or coating of lead or an alloy rich in lead as indicated at E in Figs. 2 to 7, inclusive. This coating of lead serves to prevent the adhesion of the rubber to the mandrel, inasmuch as said lead covered mandrel can be polished very smooth and is not affected by the various ingredients of the rubber during the vulcanization process and consequently with a lead covered mandrel there will be little or no difficulty in stripping the jar from the mandrel after vulcanization has taken place.

In operating with a mandrel such as herein shown and described, I first place strips of rubber in the recesses or spaces C, these strips being cut to accurately fit and completely fill the spaces. The grooves or recesses D are then filled with the rubber lugs or feet which are also shaped to accurately fit into the said grooves or recesses. A sheet of rubber which forms the bottom of the jar is then placed upon the end of the mandrel and another sheet which forms the sides and ends of the jar is wrapped around the mandrel and secured. This operation is accomplished either by hand or any suitable mechanism capable of such operations It will thus be seen that this unitary mandrel serves as the means for shaping the sides and ends of the box but also the means for positioning and holding the subdividing partitions and also the lugs or feet of each cell; and by means of which a one piece jar comprising a plurality of cells is provided.

After the battery jar has been formed in the manner indicated the mandrel with the jar thereon is placed in the vulcanizer and the battery jar vulcanized. After the same has cooled, it is stripped from the mandrel and said mandrel is then ready for use in the formation of other jars. Heretofore it has been customary to apply hooks to the edges of the jar and pull them from the mandrel, but so far as I am aware only single cells have been formed upon a mandrel; whereas in the present instance a plurality of separated or partitioned cells are formed in a one-piece jar and consequently in order to strip the jar of this type from the mandrel I propose to provide openings F in the base of the mandrel and in line with the partition spaces C so that stripping fingers can be projected upwardly through said openings, and brought into engagement with the ends of the partitions so as to exert an upward pressure from the central portion of the jar either simultaneously with hooks applied to the exterior edges or not, as preferred. In Figs. 7 and 8 I have shown a slight modification in which strips G are placed at the bottom of each recess C, the ends of said strips projecting beyond the edges of the mandrel and by raising said strips towards the end of the mandrel the vulcanized jar can be quickly and easily stripped from the mandrel. In practice I prefer to make the base A somewhat larger than the mandrel proper for ease in handling and also for protection during the vulcanizing process as the mandrels can be rapidly pushed into the vulcanizer and their bases only will contact, thereby preventing two or more jars contacting with each other and becoming connected during the vulcanizing process.

By means of a mandrel such as herein shown and described, I am able to form a battery jar comprising a plurality of cells in much less time than the same number of separate cells could be formed; and furthermore, a more accurate device so far as dimensions are concerned can be produced.

Having thus described my invention, what I claim is:

1. In a battery jar mandrel a base, and a plurality of spaced cell forming portions extending upwardly therefrom, the area of the base being greater than the areas of the cell portions whereby a lateral edge is provided, said cell portions having an enveloping covering of lead or an alloy rich in lead.

2. In a battery jar mandrel, a plurality of spaced cell forming portions and a base to which said portions are united, said base extending laterally outward beyond said spaced portions, a covering of lead or an alloy rich in lead extending over the cell forming portions and spaces therebetween, there being apertures in the base and covering between the cell forming portions and strips seated between the portions and covering the apertures.

3. A battery jar mandrel comprising a base having a plurality of spaced cell forming portions extending upwardly therefrom, said cell portions having an enveloping covering of a metal rich in lead.

In testimony whereof, I hereunto affix my signature.

JAMES H. WAGENHORST.